(12) United States Patent
Kobori et al.

(10) Patent No.: US 6,390,255 B2
(45) Date of Patent: May 21, 2002

(54) ROTARY DAMPER

(75) Inventors: Takeaki Kobori; Hirozumi Sasa, both of Tokyo (JP)

(73) Assignee: TOK Bearing Co., Ltd., Tokyo (JP)

(*) Notice: Subject to any disclaimer, the term of this patent is extended or adjusted under 35 U.S.C. 154(b) by 0 days.

(21) Appl. No.: 09/907,277

(22) Filed: Jul. 17, 2001

(30) Foreign Application Priority Data

Jul. 19, 2000 (JP) .......................................... 2000-218418

(51) Int. Cl.[7] ................................ F16F 9/14; E05F 3/14
(52) U.S. Cl. ........................................ 188/290; 188/293
(58) Field of Search ............................... 188/290, 293

(56) References Cited

U.S. PATENT DOCUMENTS

| | | | |
|---|---|---|---|
| 4,098,597 A | * | 7/1978 | Nebelung ................... 188/306 |
| 5,064,033 A | * | 11/1991 | Koike et al. ................. 188/306 |
| 5,211,267 A | * | 5/1993 | Clark .......................... 188/276 |
| 5,605,208 A | * | 2/1997 | Friedrichsen et al. ....... 188/130 |
| 5,988,329 A | * | 11/1999 | Evans, Jr. et al. .......... 188/296 |
| 6,264,264 B1 | * | 7/2001 | Kato et al. ................ 296/97.12 |

FOREIGN PATENT DOCUMENTS

JP        2000-46087        2/2000

* cited by examiner

*Primary Examiner*—Christopher P. Schwartz
(74) *Attorney, Agent, or Firm*—Merchant & Gould P.C.

(57) ABSTRACT

To provide a rotary damper in which a viscous fluid does not leak from between an inner end face of a land and an outer circumferential surface of a rotatable member, and a decrease in torque caused by an eccentric rotation of the rotating member is prevented. The rotary damper has a rotatable member being relatively rotatable with respect to a casing, the proximal portion of the rotatable member being accommodated in a chamber of the case; a ridge member extending axially along and projecting radially outwardly from an outer circumferential surface of the proximal portion of the rotatable member, the ridge member having a radially outer end face disposed for sliding contact with an inner circumferential surface of the chamber; and the land extending axially along and projecting inwardly from the inner circumferential surface of the chamber, the land having a face transverse with respect to the rotational direction of the rotatable member. The ridge member and the land divide an interior of the chamber into a compression compartment and a decompression compartment, the volume of these compartments being variable complementarily to each other in response to the relative rotation of the rotatable member and the casing. A spacer is interposed between the land and the proximal portion of the rotatable member and adapted to be pressed against the outer circumferential surface of the proximal portion and the transverse face of the land by the pressure built up in the compression compartment in response to rotation of the rotatable member.

7 Claims, 18 Drawing Sheets

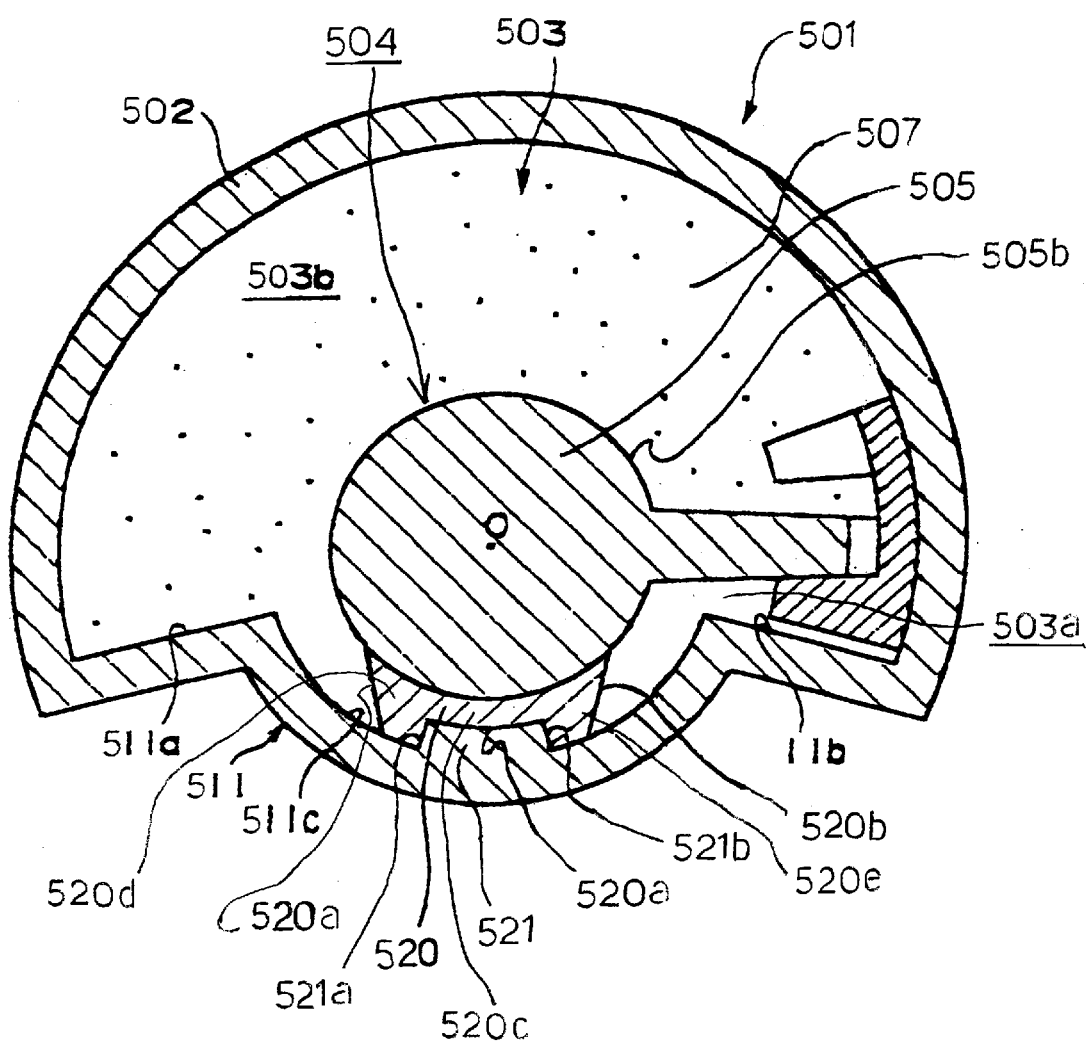

ROTARY DAMPER

BACKGROUND OF THE INVENTION

FIELD OF THE INVENTION

The present invention relates to a rotary damper for applying damping forces to, for example, a door or a cover when the door or the cover is opened or closed.

A conventional rotary damper 1 as shown in FIG. 15 has a ridge member 15 provided on an outer circumferential surface of a proximal portion 5 of a rotatable member 4 and a land 11 provided on an inner circumferential surface of a chamber 3. When the rotatable member 4 rotates to a high torque production side (in the clockwise direction in the drawing), the pressure of a viscous fluid 7 increases in a compression compartment 3a of the chamber 3, by which a high torque is obtained.

Also, a conventional rotary damper disclosed in Japanese Patent Laid-Open No. 2000-46087, as shown in FIG. 16, has a construction such that a substantially cylindrical sleeve 5 made of a synthetic resin is disposed between an inner end face 21a of a partition wall portion 21 of a casing 2 and the outer circumferential surface of a rotating shaft 3 provided with a vane member 4. Such a sleeve 5 can prevent a gap from developing between the inner end face 21a of the partition wall portion 21 of the casing 2 and the outer circumferential surface of the rotating shaft 3 because it absorbs irregularities on the inner end face 21a of the partition wall portion 21 by means of the elastic force thereof. As a result, even when a viscous fluid with allow viscosity is used, a high torque can be produced.

However, what we call a one-blade rotary damper having one ridge member 15 as shown in FIG. 15 has a problem described below. When the rotatable member 4 rotates to the high torque production side to increase the pressure of the viscous fluid 7 in the compression compartment 3a, the proximal portion 5 of the rotatable member 4 rotates eccentrically in the direction indicated by the arrow mark in FIG. 15, so that a clearance between the outer circumferential surface of the proximal portion 5 and the inner end face of the land 11 increases. Thereby, a bypath flow of the viscous fluid 7 from the clearance, which is only of a negligible amount intrinsically, is increased, so that the torque in the high torque production region decreases. As a result, sufficient damping action necessary when a door etc. provided with the rotary damper is closed cannot be accomplished.

Also, the rotary damper shown in FIG. 16 has a problem described below. The long-term use of the rotary damper develops a gap between the inner end face 21a of the partition wall portion 21 and the sleeve 5 by means of abrasion, so that the viscous fluid leaks from between the slidingly contacting surfaces of the rotating shaft 3 and the sleeve 5. As a result, the torque in the high torque production region decreases.

Accordingly, an object of the present invention is to provide a rotary damper in which even if the rotary damper is used for a long period of time, a clearance between the inner end face of partition wall and the outer circumferential surface of rotating shaft can be in a given range, whereby the torque in the high torque production region can be prevented from decreasing.

SUMMARY OF THE INVENTION

To solve the above problems, the present invention provides a rotary damper comprising a casing having a chamber defined therein; a viscous fluid filled in the chamber; a rotatable member being relatively rotatable with respect to the casing, the proximal portion of the rotatable member being accommodated in the chamber, a ridge member extending axially along and projecting radially outwardly from an outer circumferential surface of the proximal portion of the rotatable member, said ridge member having a radially outer end face disposed for sliding contact with an inner circumferential surface of the chamber; and a land extending axially along and projecting inwardly from said inner circumferential surface of the chamber, the land having a transverse face transversely with respect to rotational direction of the rotatable member, the ridge member and the land dividing an interior of the chamber into a compression compartment and a decompression compartment, the volume of the compression and decompression compartments being variable complimentarily to each other in response to the relative rotation of the rotatable member and the casing, a spacer interposed between the land and the proximal portion of the rotatable member and adapted to be pressed against the outer circumferential surface of the proximal portion of the rotatable member and the transverse face of the land by the pressure built up in the compression compartment in response to rotation of the rotatable member.

Even if a spacer portion on the outer circumferential surface side of the proximal portion of the rotatable member is worn by the long-term use of the rotary damper, the spacer can be pressed against the outer circumferential surface of the proximal portion of the rotatable member and the transverse face of the land by the pressure built up in the compression compartment.

In the present invention, a side face on the side of the compression compartment of the land forms the transverse face, and the spacer is disposed so as to cover the inner end face and the side face of the land. Therefore, since the spacer is disposed so as to straddle the land, the spacer does not come off from the land under the pressure on the compression compartment side.

In the present invention, the spacer has a portion along the side face of the land and such portion has an end face confronting the inner circumferential surface of the chamber to keep a gap therebetween. Thereby, the spacer can be press against the outer circumferential surface of the proximal portion of the rotatable member and the side face of the land by the pressure built up in the compression compartment in such a manner as to float from the inner end face of the land.

In the present invention, the land is provided with an inward protrusion on the inner end face thereof, a side face on the side of the compression compartment of the inward protrusion forms the transverse face, and the spacer is mounted on the inner end face of the land while engaging with the inward protrusion. Therefore, since the spacer is disposed so as to engage with the inward protrusion, the spacer does not come off from the land under the pressure on the compression compartment side.

In the present invention, the spacer has a portion on the side of the compression compartment, such portion has an end face confronting the inner end fare of the land to keep a gap therebetween. Thereby, the spacer is pressed against the outer circumferential surface of the proximal portion of the rotatable member and the inward protrusion by the pressure built up in the compression compartment in such a manner as to float from the inner end face of the land.

In the present invention, the spacer is made from at least one of a group consisting of plastic, rubber-like material and metal. By forming the spacer of such a material, the spacer can be pressed reliably against the outer circumferential surface of the proximal potion of the rotatable member and the transverse of the land by the pressure built up in the compression compartment.

In the present invention, the plastic material is a fluorine-containing plastic material. This offers an advantage that friction between the outer circumferential surface of the proximal portion of the rotatable member and the spacer can be decreased.

BRIEF DESCRIPTION OF THE DRAWINGS

FIG. 13A is a transverse sectional view showing a first modification of a rotary damper in accordance with the second embodiment of the present invention.

DETAILED DESCRIPTION OF THE PREFERRED EMBODIMENTS

Figure 1:
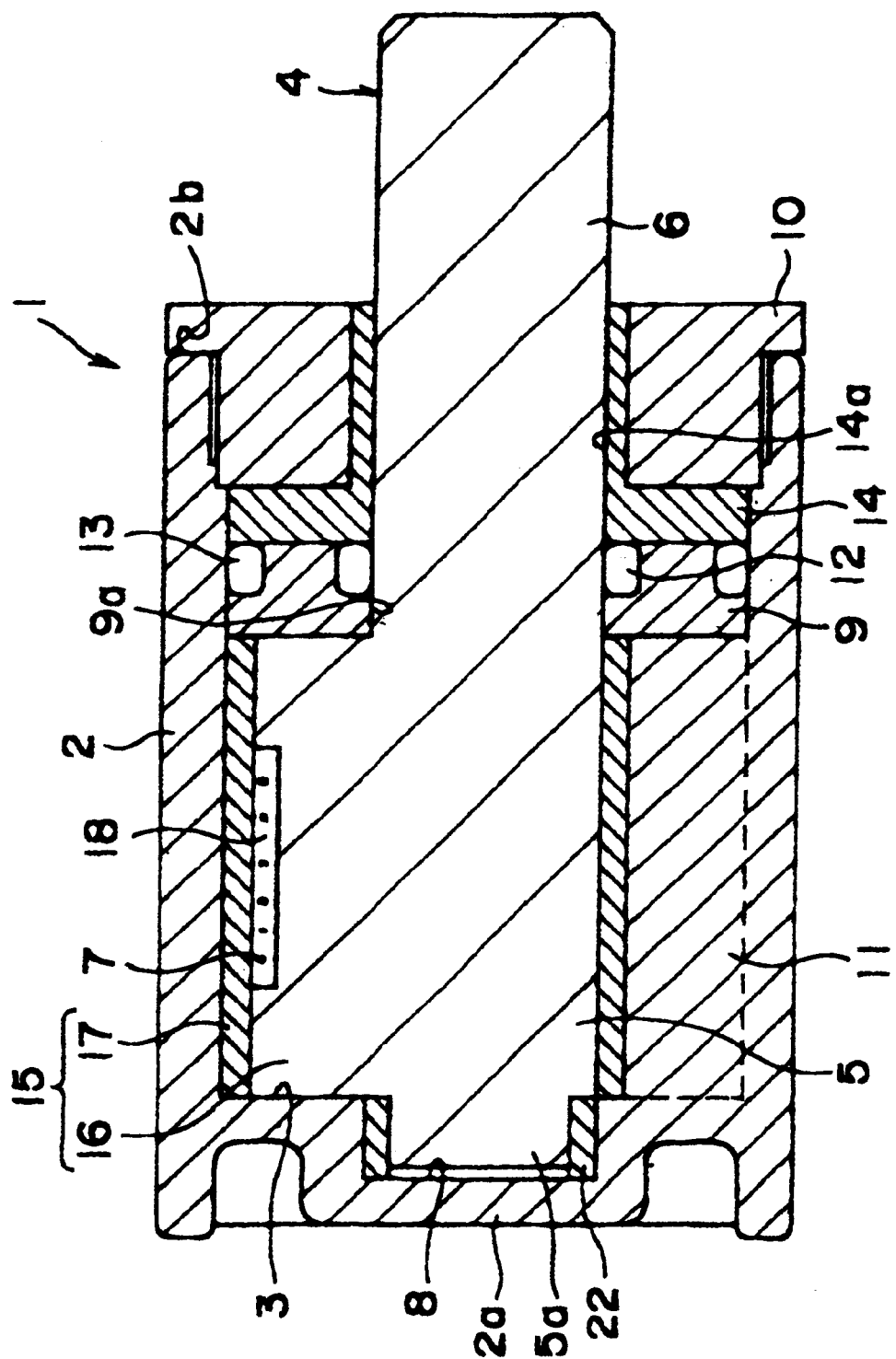
FIG. 1 is a longitudinal sectional view showing a first embodiment of a rotary damper in accordance with the present invention.
Figure 4:
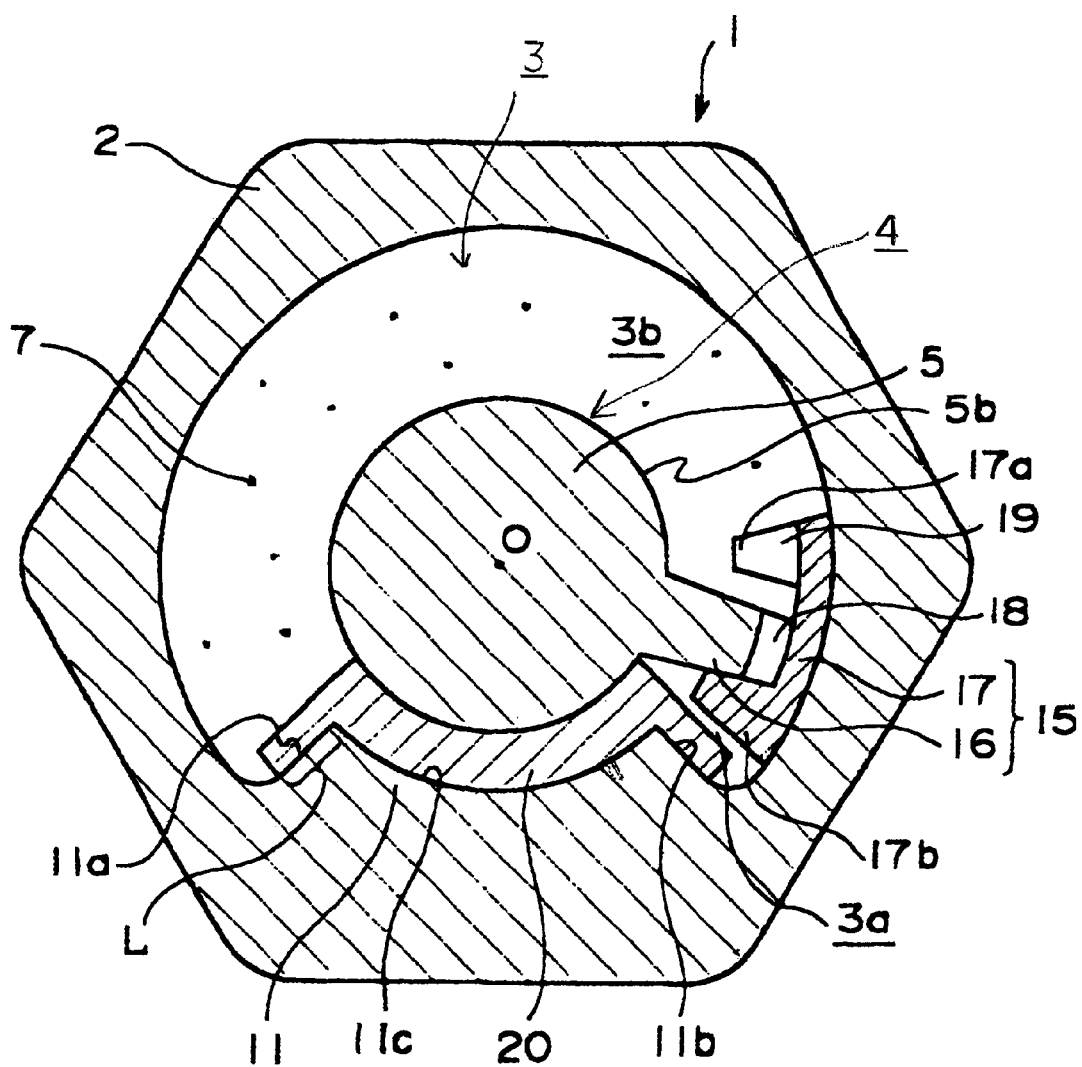
FIG. 4 is the transverse sectional view of the rotary damper in accordance with the first embodiment.
Figure 5:
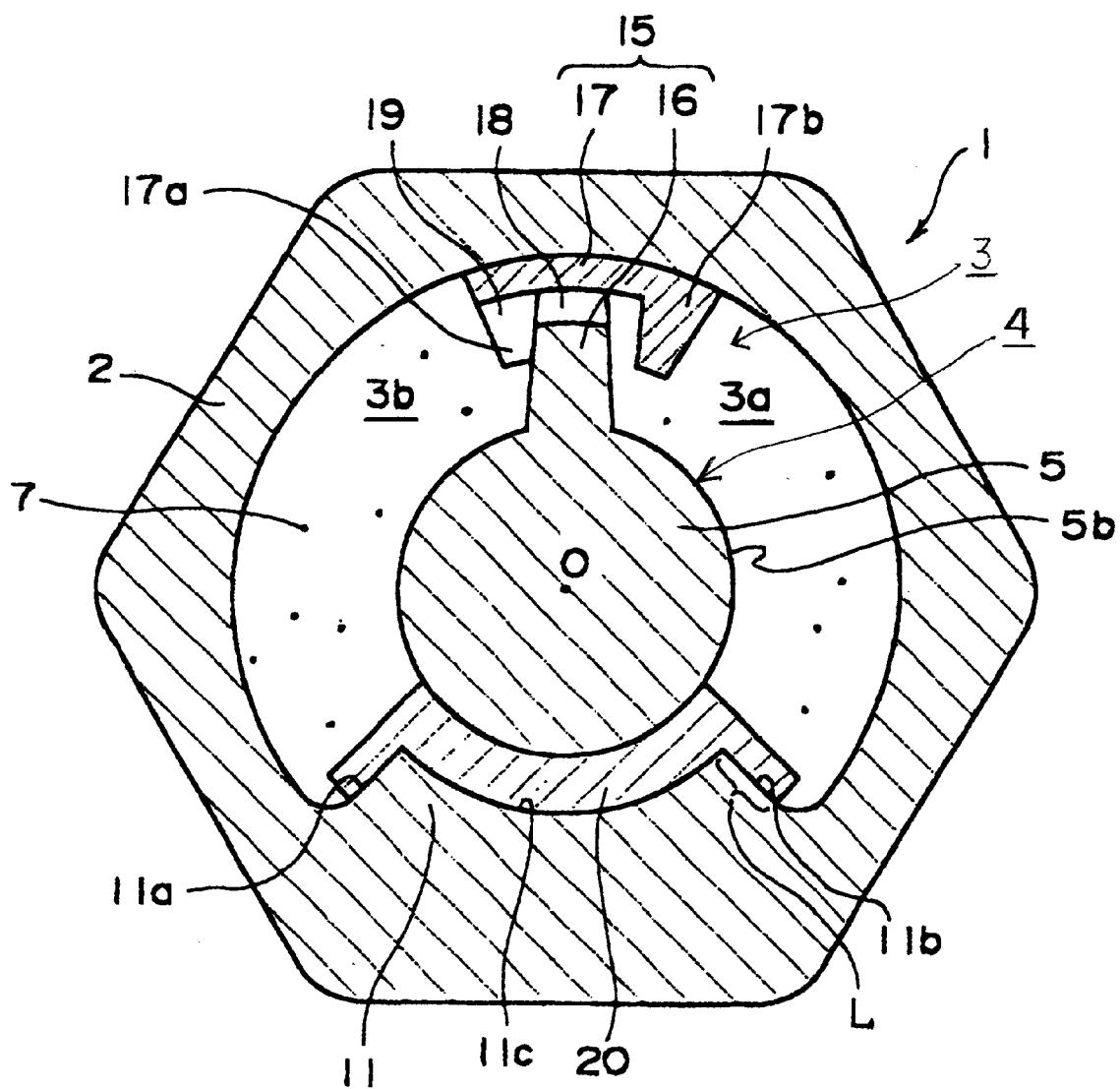
FIG. 5 is the transverse sectional view of the rotary damper in accordance with the first embodiment.
Figure 6:
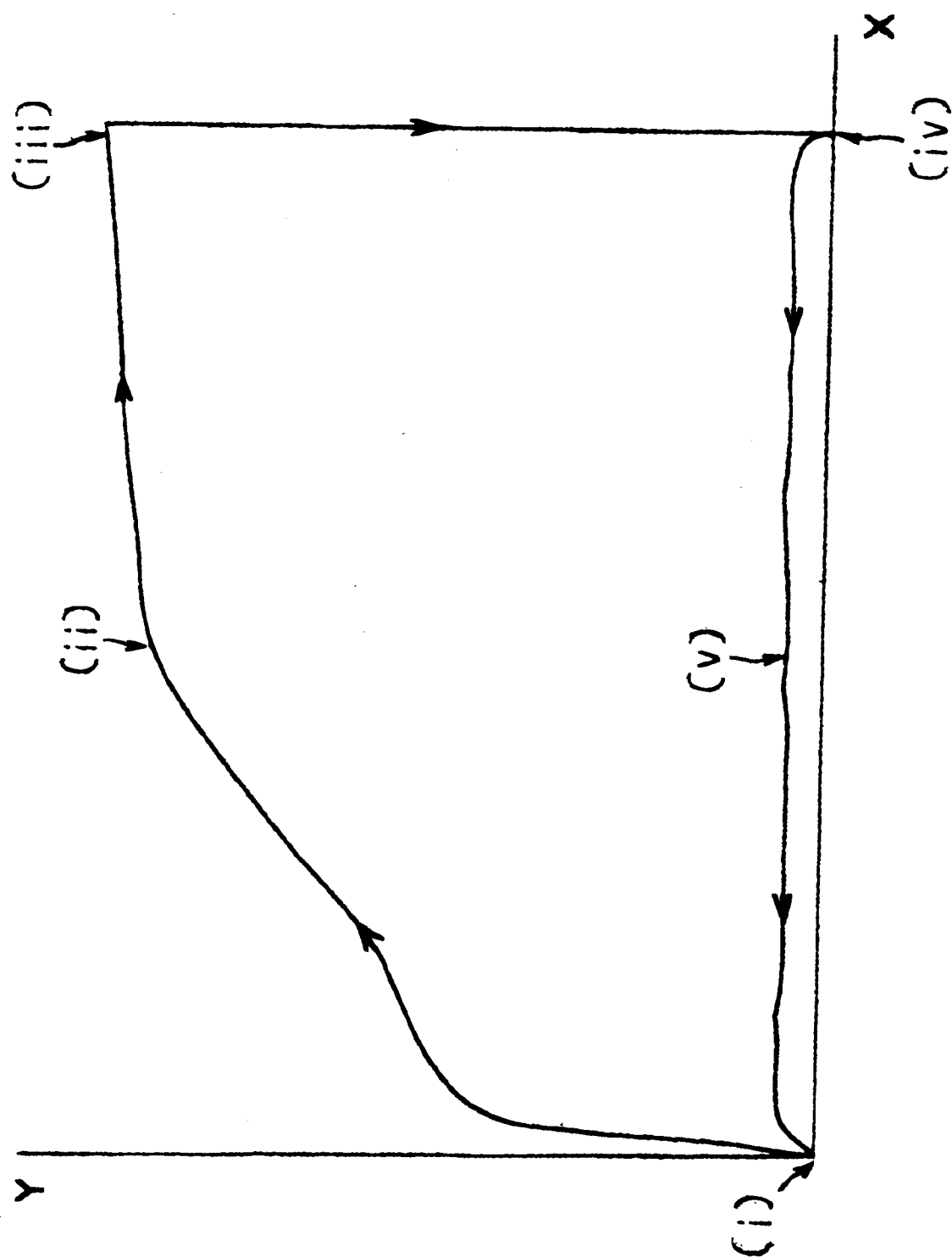
FIG. 6 is a graph showing a torque curve of the rotary damper in accordance with the first embodiment.
Figure 7:
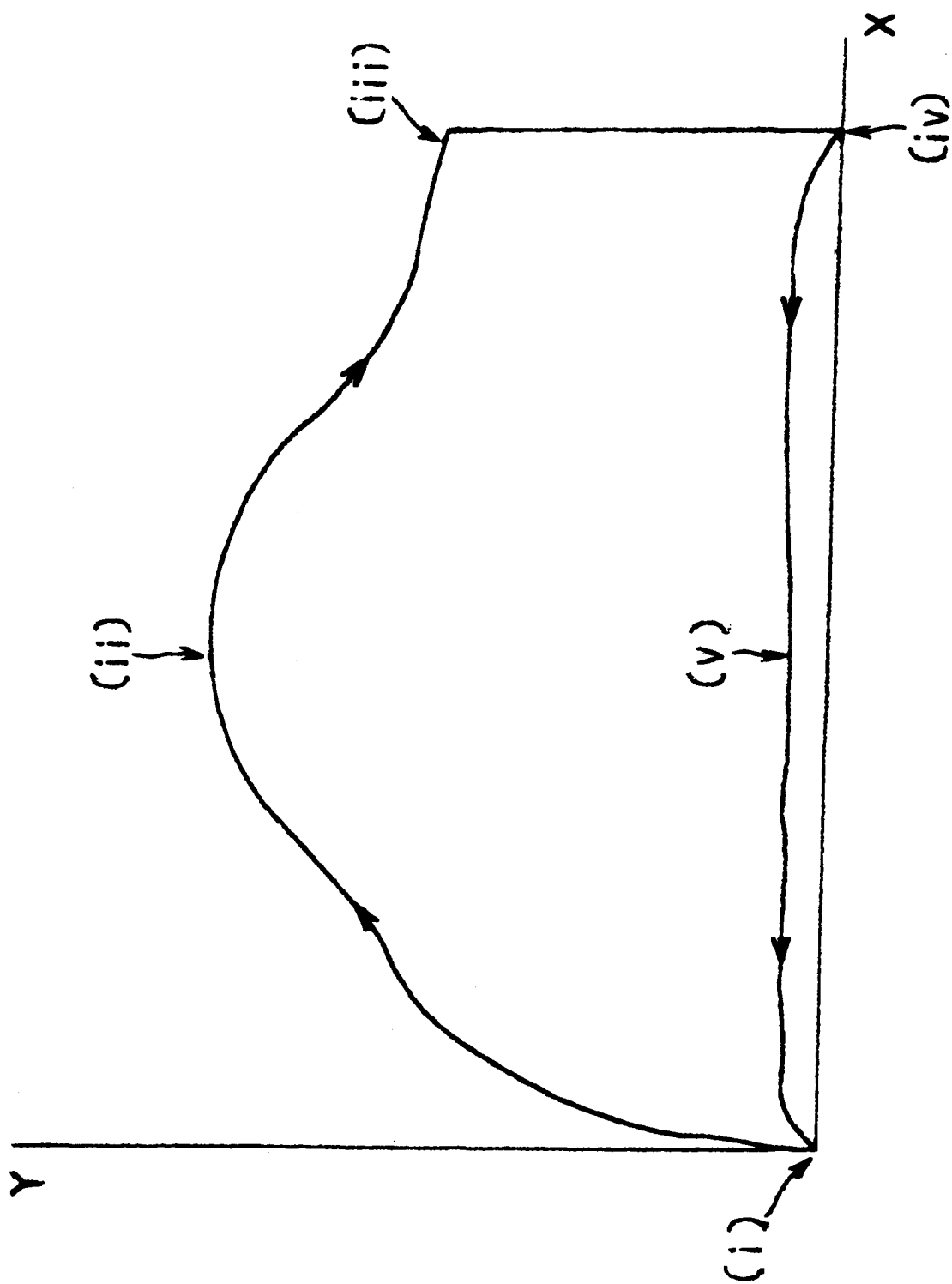
FIG. 7 is a graph showing a torque curve of the rotary damper without any spacer in the first embodiment.

Embodiments of the present invention will be described with reference to the accompanying drawings. FIGS. 1 to 5 show a first embodiment of a rotary damper in accordance with the present invention. FIG. 1 is a longitudinal sectional view of the rotary damper of this embodiment, and FIGS. 2 to 5 are transverse sectional views of the rotary damper of this embodiment, showing a state which a rotatable member rotates. Also, FIGS. 6 and 7 are graphs showing torque curves of the rotating damper of this embodiment and a rotary damper of a comparative example.

As shown in FIGS. 1 to 5, a rotary damper 1 in accordance with the first embodiment of the present invention has a construction such that a proximal portion 5 of a rotatable member 4 is accommodated in a chamber 3 defined within a casing 2, and the chamber 3 is filled with a viscous fluid 7 such as silicone oil with a high viscosity.

An end portion 2a forming the bottom of the chamber 3 within the casing 2 is closed, and a bearing recess 8 is formed in the center thereof. One en 2b of the casing 2 is open, and is sealed by an end cap 10 fixedly fitted to the open end 2b via a partition wall 9 and a flanged bush 14. Also, a land 11 is provided to extend axially along and project radially inwardly from the inner circumferential surface of the chamber 3. Both of side faces 11a and 11b of the land 11 extend in the radial direction of the casing 2, and both of the side faces are directed to the center O, and an angle made by the side faces is about 90 degrees.

The rotatable member 4 has proximal portion 5 incorporated in the chamber 3 and an extending portion 6 extending from the proximal portion 5, passing through the partition wall 9, the flanged bush 14 and the end cap 10, and thus projecting to the outside of the casing 2. on one side of the rotatable member 4, a tip end 5a of the proximal portion 5 is pivotally supported by the bearing recess 8 via a bush 22, and on the other side thereof, the extending portion 6 is pivotally supported by bearing openings 9a and 14a in the center of the partition wall 9 and the flanged bush 14, respectively.

A seal is provided between the extending portion 6 and the bearing opening 9a in the center of the partition wall 9 via a sealing member 12 such as an O-ring mounted on the extending portion 6, and another seal is provided between the outer circumferential surface of the partition wall 9 and the inner circumferential surface of the casing 2 via a sealing member 13 such as an O-ring mounted on the partition wall 9. By the flanged bush 14 and the sealing members 12 and 13 interposed between the partition wall 9 and the end cap 10, the viscous fluid 7 is prevented from leaking from the interior of the casing 2.

On an outer circumferential surface 5b of the proximal portion 5 of the rotatable member 4, a ridge member 15 is provided to extend axially along and project radially outwardly from the outer circumferential surface. The ridge member 15 is made up of a ridge protrusion 16 projecting from the outer circumferential surface 5b of the proximal portion 5 and a substantially U-shape movable valve 17 mounted detachably so as to straddle the ridge protrusion 16. The ridge protrusion 16 is formed with a cut-away groove 18 constituting one of fluid passages, and one hanging wall 17a of both hanging walls 17a and 17b of the movable valve 17 on the opposite sides of the ridge protrusion 16 is also formed with a cut-away groove 19 constituting the fluid passage. A distance between both of the hanging walls 17a and 17b of the movable valve 17 is larger than the width in the direction of rotation of the ridge protrusion 16, and the ridge protrusion 16 is fitted to the movable valve 17 so as to be loose in the direction of rotation.

On rotating the rotatable member 4, the outer end face of the movable valve 17 straddling the ridge protrusion 16 is in sliding contact with the inner circumferential surface of the chamber 3. Also, one end in the axial direction of the movable valve 17 and the ridge protrusion 16 is in sliding contact with the inner wall fact of the partition wall 9, and the other end in the axial direction thereof is in sliding contact with the inner wall face of the closing end 2a of the casing 2.

A spacer 20 is mounted on the land 11 between the land 11 and the outer circumferential surface 5b of the proximal portion 5 of the rotatable member 4 so as to cover the side faces 11a and 11b along the axial direction of the land 11 and an inner end face 11c in the radial direction. The spacer 20 covering the side faces 11a and 11b of the land 11 has a length L in the radial direction.

As the material for the spacer 20, plastic, rubber-like material, metal or a combination thereof is preferably used.

Figure 3:
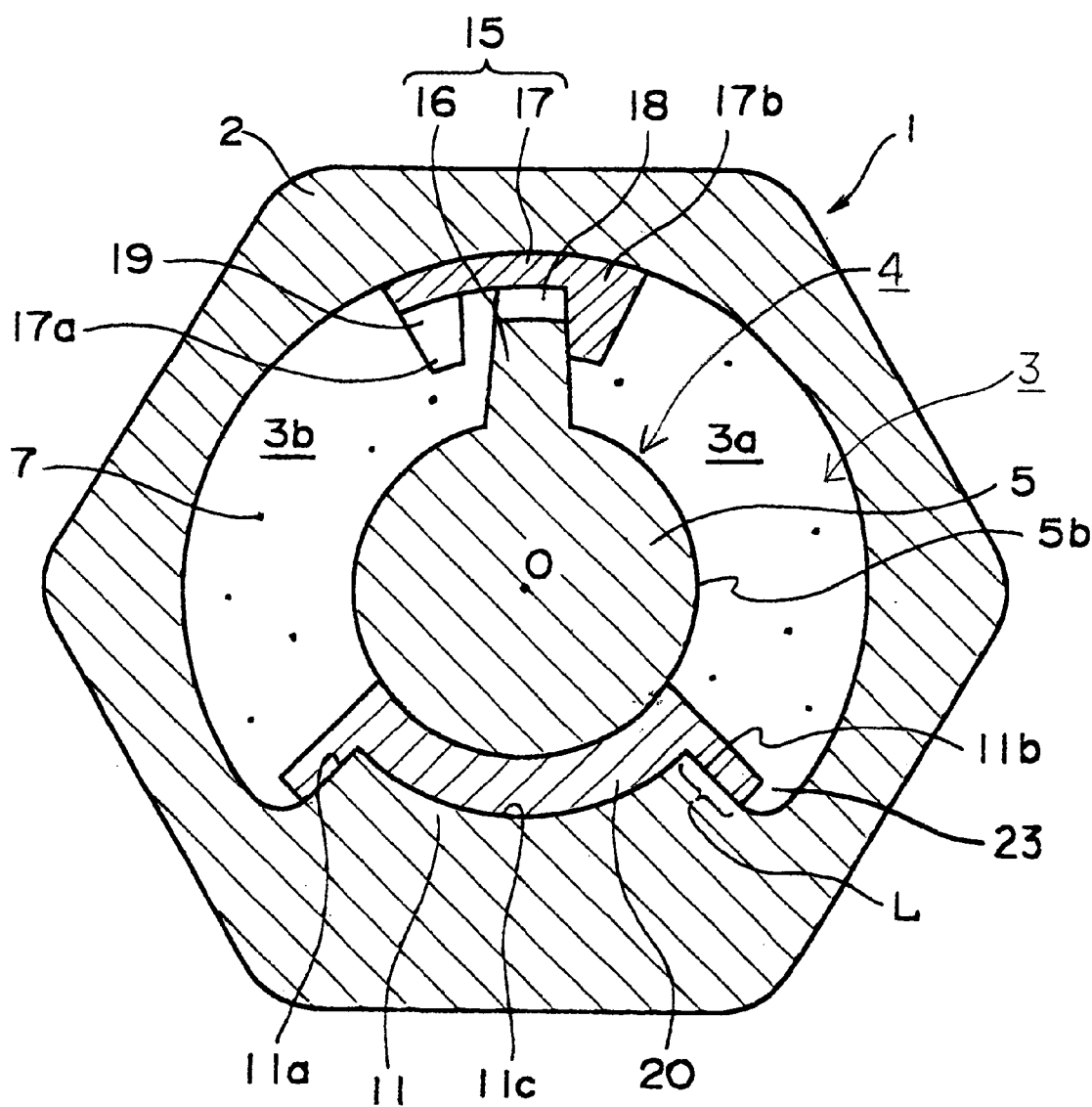
FIG. 3 is the transverse sectional view of the rotary damper in accordance with the first embodiment.

As shown in FIG. 3, by the cooperation of the ridge member 15 and the land 11, the interior of the chamber 3 is divided into a compression compartment 3a and a decompression compartment 3b so that the compression and decompression compartments 3a, 3b are variable complimentarily to each other in response to said relative rotation of the rotatable member 4 and casing 2. The compression compartment 3a is located on the front side of the ridge protrusion 16 in a chamber 3 when the proximal portion 5 of the rotatable member 4 is rotated in the direction such that the ridge protrusion 16 comes into contact with the handging wall 17b without any fluid passage of the movable valve 17 (in the clockwise rotating direction in the drawing), and the decompression compartment is located on the rear side of the ridge protrusion 16 in a chamber 3.

The following will be a description of the operation of the rotary damper in accordance with the above-described first embodiment.

Figure 2:
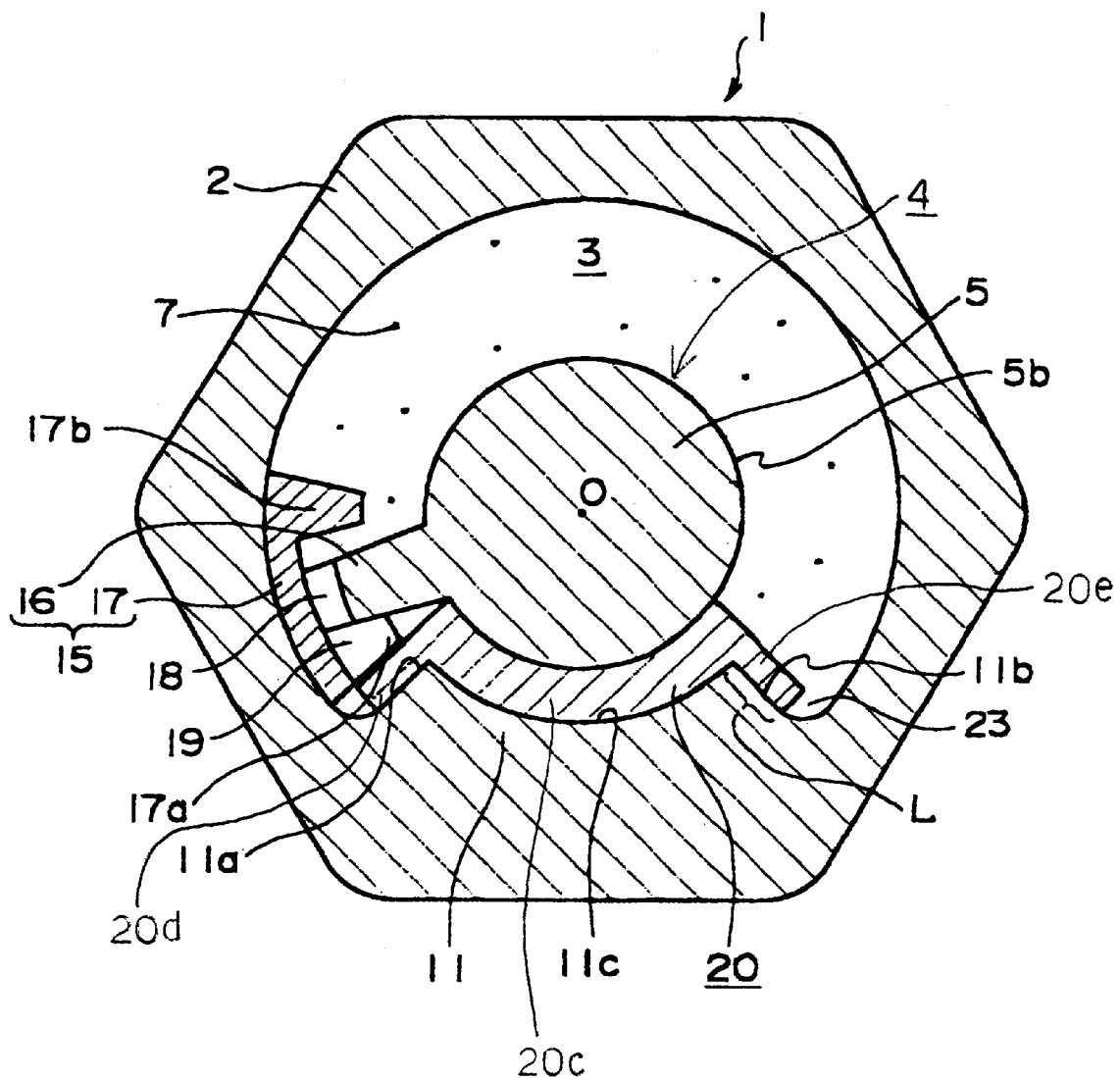
FIG. 2 is a transverse sectional view of a rotary damper in accordance with the first embodiment.

Referring to FIG. 2, when the proximal portion 5 of the rotatable member 4 is rotated in a first direction (in the clockwise direction in FIG. 2) On the chamber 3 of the casing 2, the ridge protrusion 16 move between both of the hanging walls of the movable valve 17 in the direction of rotation, so that a first side face of the ridge protrusion 16 is pressed against the opposed hanging wall 17b of the movable valve 17. At this time, the cut-away groove 18 in the ridge protrusion 16 is closed by the hanging wall 17b of the movable valve 17.

FIG. 2 shows a state in which the rotatable member 4 stands still. This state corresponds to (i) of the torque curve shown in FIG. 6 because no torque is produced in this state. In the torque curve shown in FIG. 6, the abscissa X represents the angle of rotation of the ridge member 15 from the position shown in FIG. 2 or an arbitrary scale, and the ordinate Y represents produced torque on an arbitrary scale.

In FIG. 2, the rotatable member 4 is further rotated in the clockwise direction in the drawing, and is rotated to a position corresponding to about a half of the angle of full rotation, by which the state shown in FIG. 3 is established. In this state, the fluid pressure in the compression compartment 3a is increased, an the increased fluid pressure acts on the spacer 20. The side face 11b on the side of the compression compartment 3a of the land 11 forms a transverse face which is disposed transversely with respect to the rotational direction of said rotatable member 4. The spacer 20 has a body portion 20c positioned between the land 11 and the proximal portion 5 of the rotatable member 4, and extension portions 20d, 20e extending from the body portion 20c along the side face 11a, 11b of the land 11, respectively. The extension portion 20e close to the compression compartment 3a along the side face 11b of the land 11 has an end face confronting the inner circumferential surface of the chamber 3 to keep a gap 23 therebetween. In the state shown in FIG. 3, the high fluid pressure acts on the gap 23, by which the spacer 20 is pressed again t the outer circumferential surface 5b of the proximal portion 5 and the side face 11b of the land 11 in such a manner as to float slightly from the inner end face 11c of the land 11. As a result, the pressure in the compression compartment 3a can be kept high, so that the produced torque can be kept high.

The gap may be formed between the extension portion 20d of the spacer 20 along the side face 11a of the land 11 and the inner circumferential surface of the chamber 3, as shown in FIG. 2.

The state shown in FIG. 3 corresponds to (ii) of the torque curve shown in FIG. 6. The produced torque increases suddenly from the state shown in FIG. 2, and reaches a value close to the maximum torque in the state shown in FIG. 3.

In FIG. 3, the rotatable member 4 is further rotated in the clockwise direction in the drawing. FIG. 4 shows a state just before the hanging wall 17 of the movable valve 17 comes into contact with one side face of the spacer 20 and thus the rotation stops. During the time when the state changes from the state shown in FIG. 3 to that shown in FIG. 4, the fluid pressure in the compression compartment 3a further increases. Therefore, by the action of the high fluid pressure on the spacer 20, as same manner as shown in FIG. 3, the spacer 20 is brought more firmly into contact with the outer circumferential surface 5b of t he proximal portion 5 and the side face 11b of the land 11 in such a manner as to float further from the inner end face 11c a the land 11. Thereby, the pressure in the compression compartment 3a can be kept higher, with the result that the produced torque can be kept high reliably.

The state shown in FIG. 4 corresponds to (iii) of the torque curve shown in FIG. 6, showing the substantially maximum torque produced . The state from (ii) to (iii) indicates the higher torque region in which the produced torque increases slightly.

As described above, even if a spacer 20 portion that is in contact with the outer circumferential surface 5b of the proximal portion 5 of the rotatable member 4 is worn by the long-term use of the rotary damper, in the rotation region in which high torque is required for the rotatable member 4, the spacer 20 is pressed against the outer circumferential surface 5b of the proximal portion 5 and the side face 11b of the land 11 by the high fluid pressure built up in the compression compartment 3a, so that the produced torque can be prevented from:decreasing.

FIG. 7 shows a torque curve in the case where the spacer is removed from the rotary damper in accordance with the first embodiment. The symbols in FIG. 7 are the same as those in FIG. 6. In FIG. 7, the maximum torque is produced in the vicinity of (ii), and in the region from (ii) to (iii), the produced torque decreases gradually. The reason for this is that the rotatable member 4 is rotated eccentrically by the increase in fluid pressure in the compression compartment 3a, so that a clearance between the outer circumferential surface 5b of the proximal portion 5 and the land 11 increases. As a result, the bypath flow of the viscous fluid 7 through the increased clearance increases which causes the torque to decreases. Thus, if no spacer is used, a desired high torque cannot be obtained.

Next, when the rotatable member 4 is further rotated in the clockwise direction in FIG. 4 from the state shown in FIG. 4, the hanging wall 17b of the movable valve 17 comes into contact with one side face of the spacer 20 and thus the rotation stops. When the rotatable member 4 is rotated reversely in a second direction (in the counterclockwise direction) from the stop state, the ridge protrusion 16 moves between both of the hanging walls of the movable valve 17 in the counterclockwise direction in the drawing, so that a second side face of the ridge protrusion 16 is pressed against the opposed hanging wall 17a formed with the cut-away groove 19. Further, the rotatable member 4 is rotated counterclockwise to a position corresponding to about a half of the angle of full rotation, by which the state shown in FIG. 5 is established. When the rotatable member 4 is rotated further in the same direction, the hanging wall 17a of the movable valve 17 comes into contact with the other side face of the spacer 20 and thus the rotation stops, by which the state returns to the state shown in FIG. 2.

During the time when the rotatable member 4 is rotated A counterclockwise as described above, the cut-away groove 18 in the ridge protrusion 16 communicates with the cut-away groove 19 in the hanging wall 17a and is opened. Therefore, the viscous fluid 7 moves smoothly from the compression compartment 3b to the decompression compartment 3a, so that the rotatable member 4 rotate substantially without resistance.

In the torque curve for the counterclockwise rotation of the rotatable member 4, the produced torque is zero at (iv) where the rotatable member 4 stands still, and torque is scarcely produced during the time when the state changes from (iv) to (i) through (v) corresponding to FIG. 5 because the viscous fluid 7 moves smoothly from the compression compartment 3b to the decompression compartment 3a.

Although an example in which a pair of the ridge member 15 and the land 11 is used has been described in this embodiment, the configuration may be such that a plurality of lands are provided on the inner circumferential surface of the chamber 3 at equal intervals in the circumferential direction to divide the chamber 3, and one ridge member is accommodated in each of the divided chamber. However, since eccentric wear occurs remarkably in the case of what we call a one-blade rotary damper having one ridge member 15, the action of such a spacer 20 achieves a pronounced effect especially for a rotary damper using a pair of ridge member and land.

The ridge member is not limited to the type shown in this embodiment, and any ridge member may be used if it has a construction such that a fluid passage for causing the compression compartment and the decompression compartment to communicate with each other can be formed. Further, the construction may be such that the ridge protrusion and the movable valve are constructed s that the fluid passages are not formed, and a fluid passage for causing the compression compartment to communicate with the decompression compartment is provided in the inside face of the partition wall or in the inside face at the end of the casing.

As the material for the spacer 20, a rubber-like material may be used to enhance the property of close contact with the outer circumferential surface 5b of the proximal portion 5 of the rotatable member 4, or, for example, a fluorine-containing plastic having low friction may be used to decrease friction between the outer circumferential surface 5b of the proximal portion 5 and the spacer 20. Alternatively, a metal with high wear resistance may be used.

Figure 10:
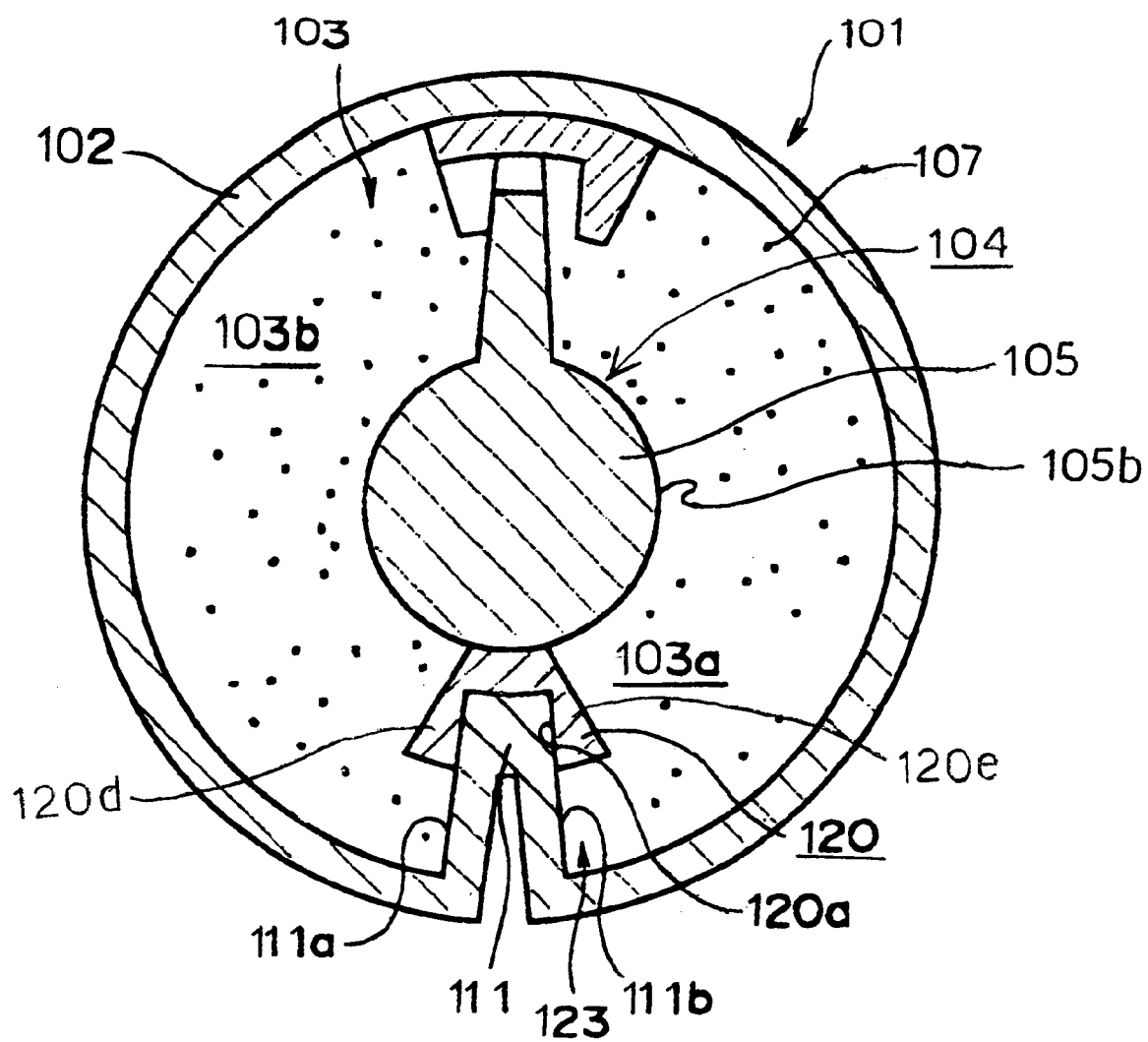
FIG. 10 is a transverse sectional view showing a first modification of the rotary damper in accordance with the first embodiment of the present invention.
Figure 11:
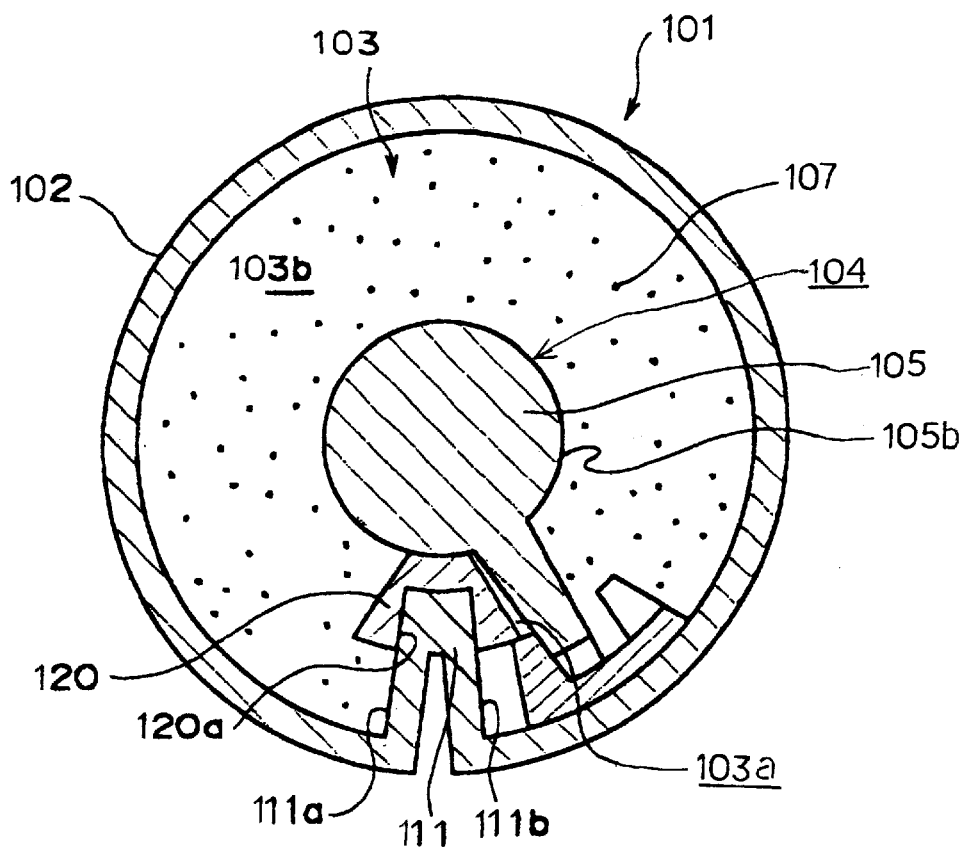
FIG. 11 is a transverse sectional view showing the first modification of the first embodiment.
Figure 15:
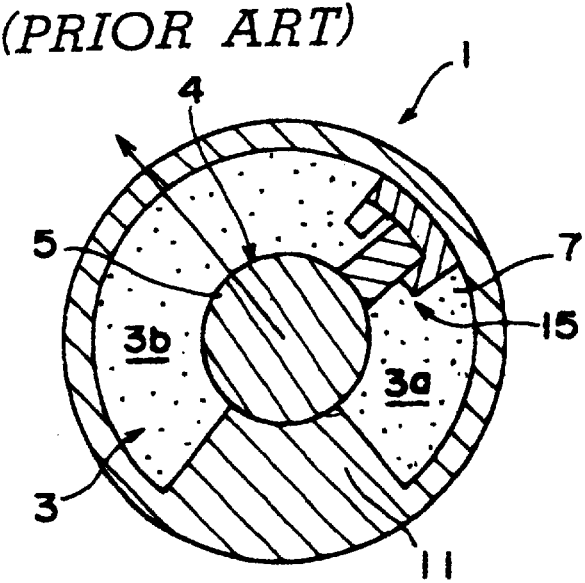
FIG. 15 is a transverse sectional view of a conventional rotary damper.

A first modification of t above-described first embodiment will be described with reference to FIGS. 10 and 11, except for the same elements as those in the first embodiment. FIGS. 10 and 11 are transverse sectional views of a rotary damper of this modification. FIG. 10 shows the state corresponding to the state shown in FIG. 5 in the first embodiment, and FIG. 11 shows the state corresponding to the state shown in FIG. 4. In FIGS. 10 and 11, the same reference numerals are applied to the same elements as those in the first embodiment.

In the rotary damper 101 of this modification, the casing 102 is of a substantially cylindrical shape, and the land 111 is provided by forming a groove of an acute triangle shape in cross section along the axial direction on the outer circumferential surface of the chamber 103. An angle formed by the meeting of the side faces 111a and 111b of the land 111 extending in an inward direction of the casing 102 is about 15 degrees, a land with a small angle being formed.

The upper face of the spacer 120 has a shape substantially complementary to the outer circumferential surface of the proximal portion 105. In the lower face of the spacer 120, a concave portion 120a engaging with the upper part of the land 111 is provided in a substantially central portion in the circumferential direction. The side face 111b on the side of the compression compartment 103a of the land 111 forms a transverse face which is disposed transversely with respect to the rotational direction of said rotatable member 104. The spacer 120 has extension portions 120d, 120e along the side face 111a, 111b of the land 111, respectively. The extension portion 120e closet the compression compartment 103a along the side face 111b has an end face confronting the inner circumferential surface the chamber 103 to keep a gap 123 there between. As shown FIG. 10, the gap maybe formed between the extension portion 120d of the spacer 120 along the side face 111a of the land 111 and the inner circumferential surface of the chamber 103.

As shown in FIG. 10, when the rotary damper is assembled, the spacer 120 is mounted on the land 111 in such a manner that the upper part of the land 111 fits into the concave portion 120a.

In the state shown in FIG. 10 (during the time when the rotatable member 104 is rotating counterclockwise in the drawing), the viscous fluid 117 moves smoothly from the compression compartment 103b to the decompression compartment 103a, so that torque is scarcely produced. Therefore, the rotatable member 104 rotates substantially without resistance.

In the state shown in FIG. 1, the fluid pressure in the compression compartment 103a exhibits the maximum value.

When such a high fluid pressure acts on the spacer 120, the high fluid pressure is applied to the gap 123 formed between the spacer 120 and the inner circumferential surface of the chamber 103. As a result, the upper face of the spacer 120 comes to be pressed against close contact with the outer circumferential surface 105b of the proximal portion 105 and the side face on the compression compartment side of the concave portion 120a of the spacer 120 comes to be pressed against the side face 111b on the compression compartment side of the land 111 in such a manner that the spacer 120 floats slightly toward the inside along the side faces 111a and 111b of the land 111. Thereby, the pressure in the compression compartment 103a can be kept high, with the result that the produced torque can be kept high reliably.

Next, a second modification of the above-described first embodiment will be described oh the basis of FIGS. 12A and 12B, except for the same elements as those in the first embodiment.

Figure 12A:
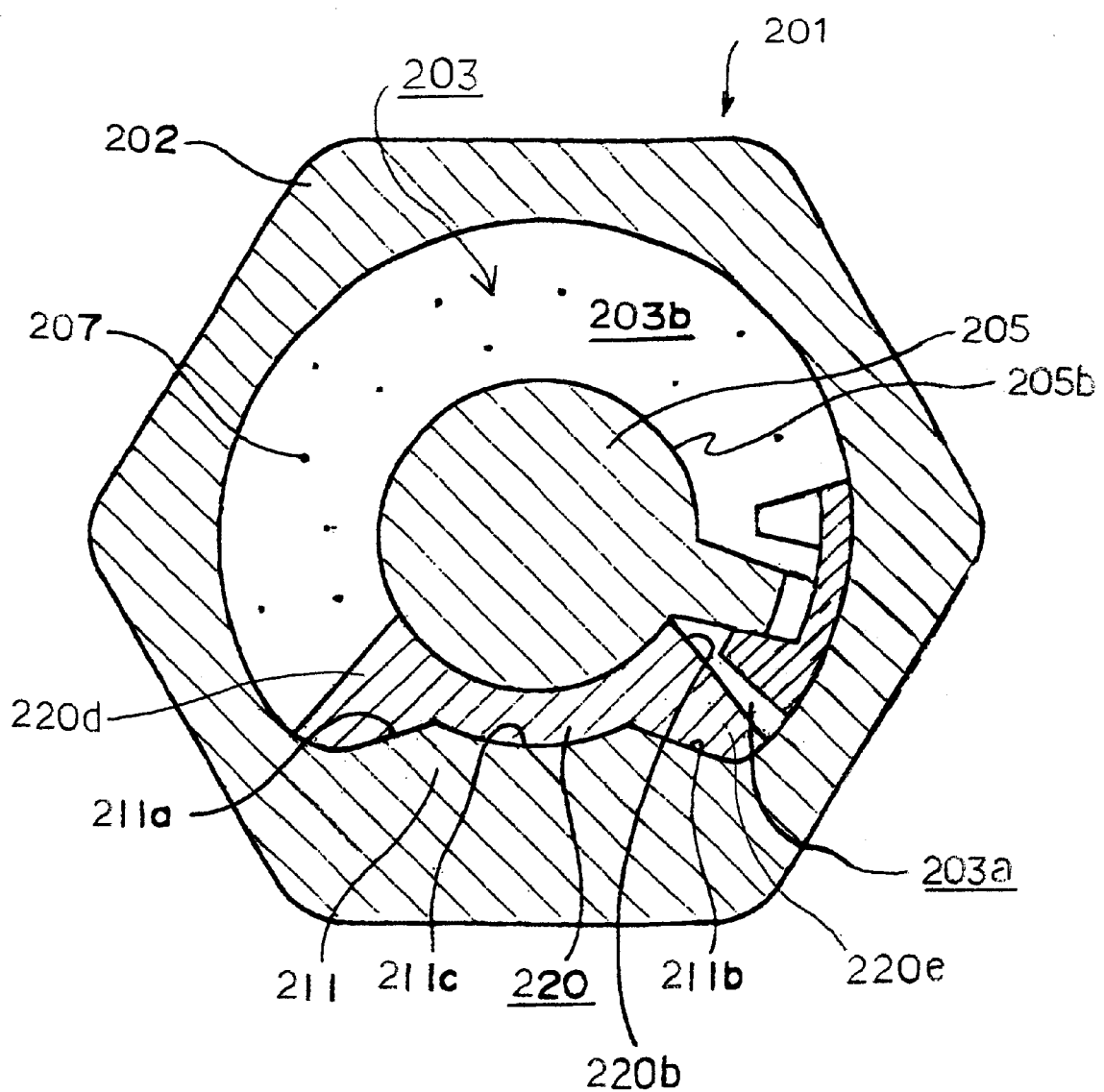
FIG. 12A is a transverse sectional view showing a second modification of a rotary damper in accordance with the first embodiment of the present invention.

As shown in FIG. 12A, in this modification, an angle made by the side faces 211a and 211b in the case where the side faces 211a and 211b of the land 211 are extended to the inside of the casing is large. The side face 211b on the side of the compression compartment 203a of the land 211 forms a transverse face which is disposed transversely with respect to the rotational direction of said rotatable member 204. The spacer 220 has extension portions 220d, 220e along the side face 211a, 211b of the land 211, respectively. The extension portion 220e closed to the compression compartment 203a has an end face confronting the inner circumferential of the chamber 203. No gap is formed between the end face of the portion 220e and the inner circumferential of the chamber 203 so that the end face of the portion 220e is in contact with the inner circumferential surface of the chamber 203. AS shown in FIG. 12A, no gap may be formed between the end face of the portion 220d and the inner circumferential of the chamber 203.

Figure 12B:
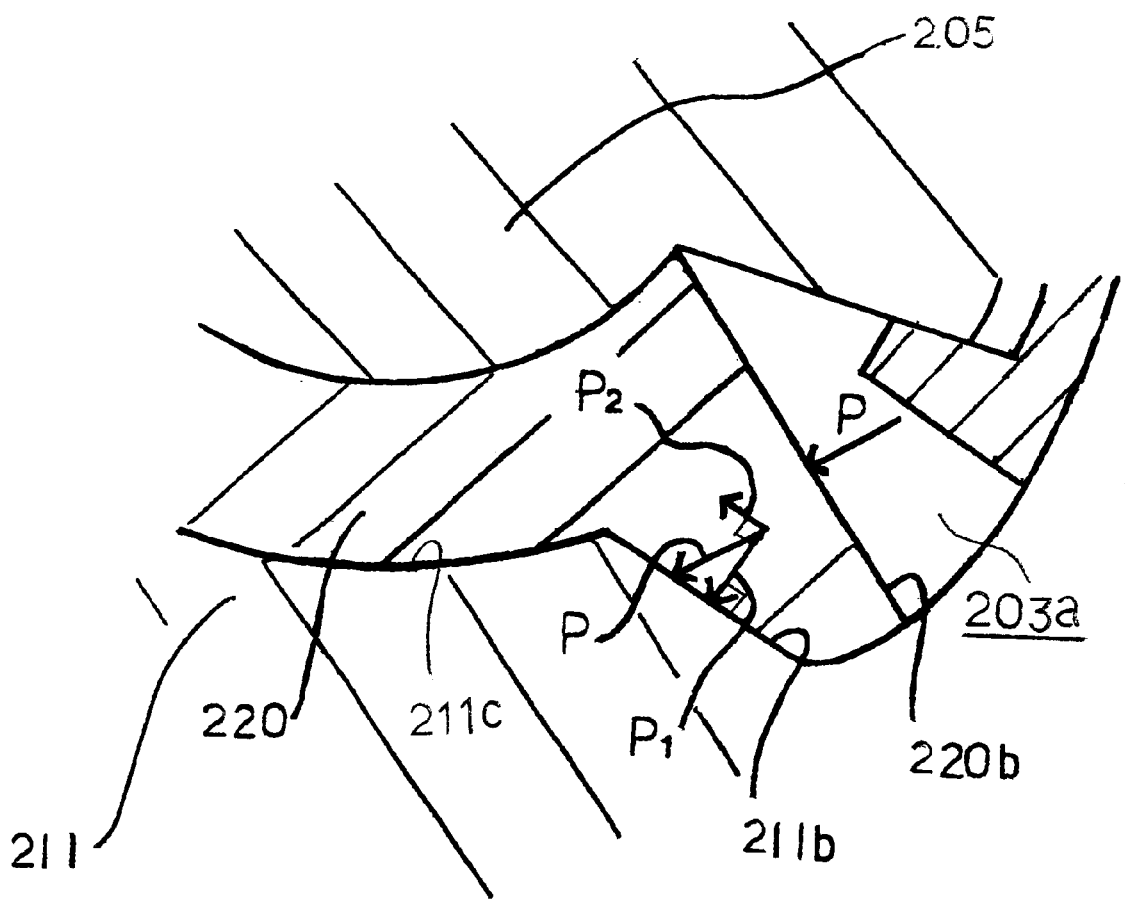
FIG. 12B is a partially enlarged view of FIG. 12A.

As shown in FIG. 12B, the fluid pressure P in the compression compartment 203a acts perpendicularly on a side face 220b on the compression compartment 203a side of the spacer 220. This fluid pressure P also acts on the side face 211b on the compression compartment 203a side of the land 211. The fluid pressure P acting on the side face 211b on the compression compartment 203a side of the land 211 is divided into a component pressure $P_1$ in the direction perpendicular to the side wall 211b and a component pressure $P_2$ in the direction parallel thereto. By the component pressure $P_2$, the spacer 220 is moved upward along the side face 211b of the land 211. Therefore, even if a gap is not formed between the end face of the portion on the compression compartment 203a of the spacer 220 and the inner circumferential surface of the chamber 203, the spacer can be pressed reliably against the outer circumferential surface 205b of the proximal portion 205 and side face 211b of the land 211 by the pressure of the compression compartment 3a acting on the spacer side face 220b in such a manner that the spacer 220 floats slightly from the inner end face 211c of the land 211.

Next, a third modification of the above-described first embodiment will be described with reference to FIGS. 14A and 14B, except for the same elements as those in the first embodiment.

Figure 14A:
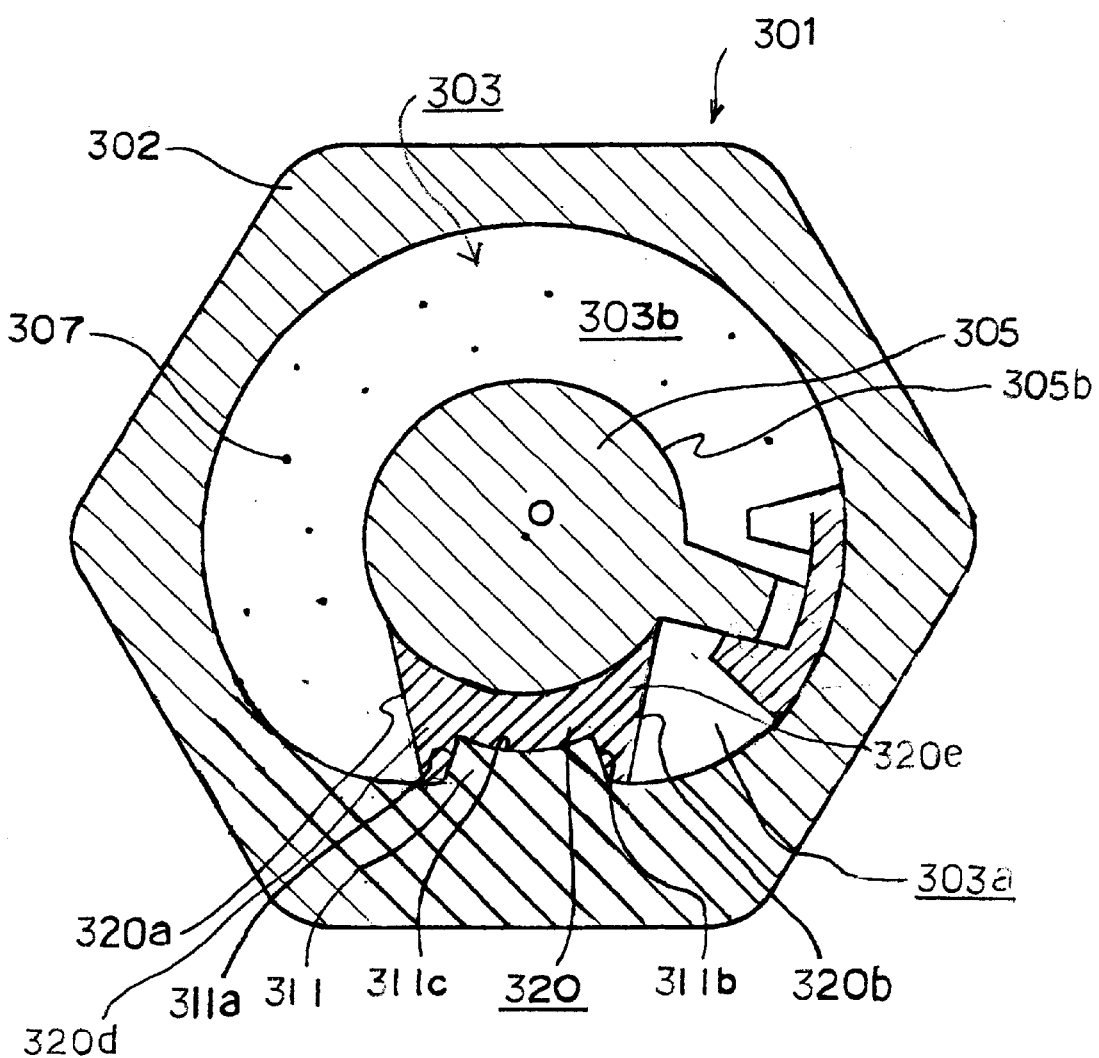
FIG. 14A is a transverse sectional view showing a third modification of a rotary damper in accordance with the first embodiment of the present invention.

As shown in FIG. 14A, in this modification, the side face 311b or the side of the compression compartment 303a of the land 311 forms a transverse face which is disposed transversely with respect to the rotational direction of said rotatable member 304. The spacer 320 has extension portions 320d, 320e along the side face 311a, 311b of the land 311, respectively. The extension portion 320e close to the compression compartment 303a has an end face confronting the inner circumferential of the chamber 303. No gap is formed between the end face of the portion 320e and the inner circumferential of the chamber 303 so that the end face of the portion 320e is in contact with the inner circumferential surface of the chamber 303. AS shown FIG. 14A, no gap may be formed between the end face of the portion 320d of the spacer 320 along the side face 311a of the land 311 and the inner circumferential of the chamber 303. In this modification, although an angle made by the side faces 311a and 311b in the case where the side faces 311a and 311b of the land 311 are extended to the inside of the casing is relative small, extended lines of the side faces 320a and 320b of the spacer 320 are tapered toward the outside of the casing.

Figure 14B:
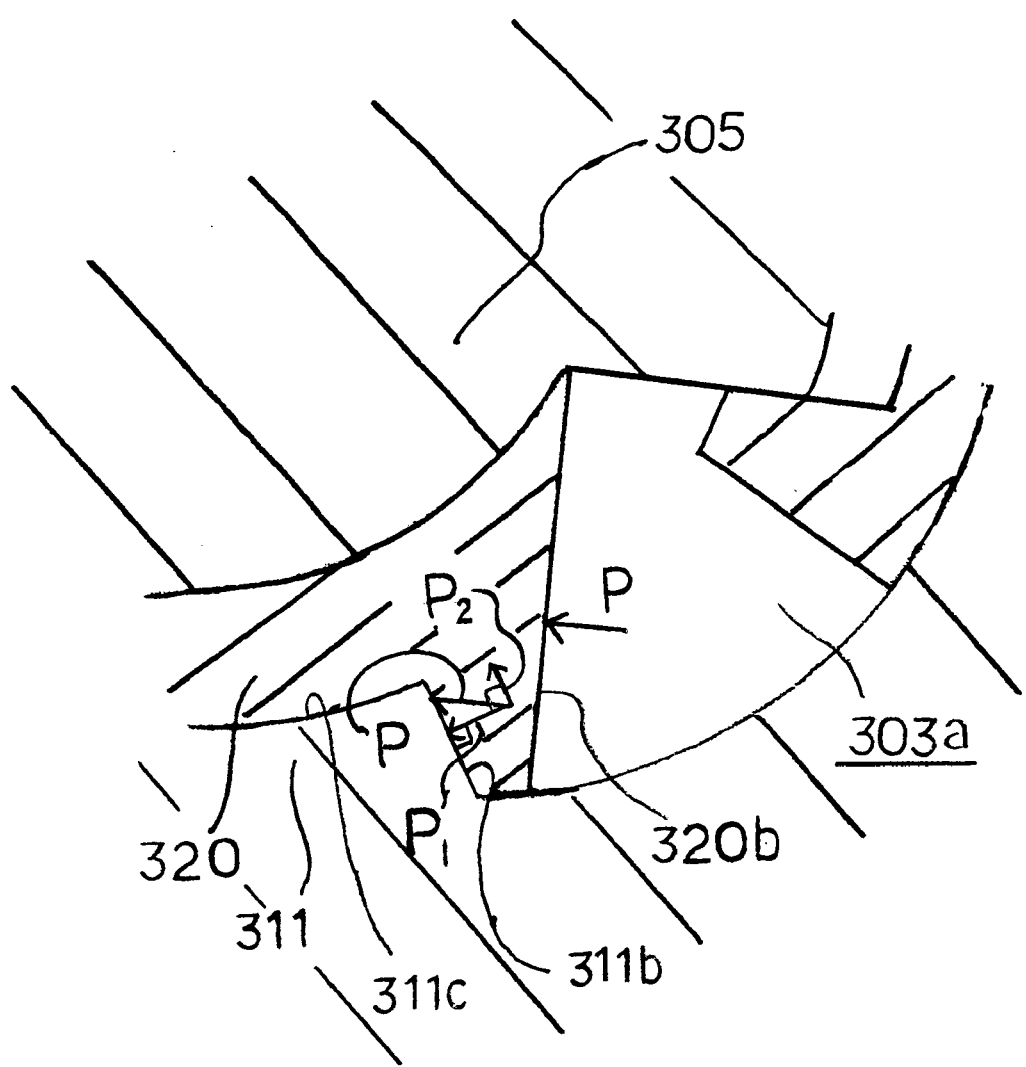
FIG. 14B is a partially enlarged view of FIG. 14A.
Figure 16:
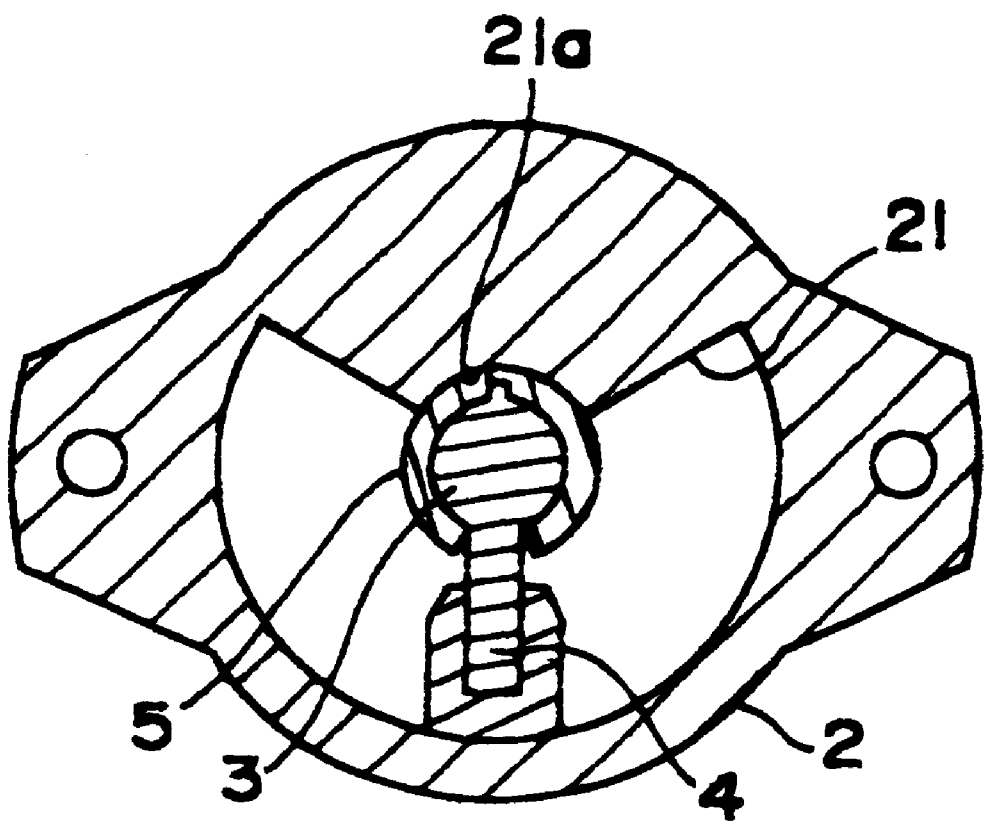
FIG. 16 is a transverse sectional view of the conventional rotary damper.

As shown in FIG. 14B, the fluid pressure P in the compression compartment 303a acts perpendicularly on the side face 320b on the compression compartment 303a side of the spacer 320. This fluid pressure P also acts on the side face 311b on the compression compartment 303a side of the land 311. The fluid pressure P acting on the side face 311b on the compression compartment 303a side of the land 311 is divided into a component pressure $P_1$ in the direction perpendicular to the side wall 311b and a component pressure $P_2$ in the direction parallel thereto. By die component pressure $P_2$, the spacer 20 is moved upward along the side face 311b of the land 311. Therefore, even if a gap is not formed between the end face of the portion on the side of the compression compartment 303a of the spacer 20 and the inner circumferential surface of the chamber 303, the spacer 320 can be pressed reliably against the outer circumferential surface 305b of the proximal portion 305 and the side face 311b of the land 311 by the pressure of the compression compartment 303a acting on the spacer side face 320b in such a manner that the spacer 20 floats slightly from the inner end face 311e of the land 311.

Figure 8:
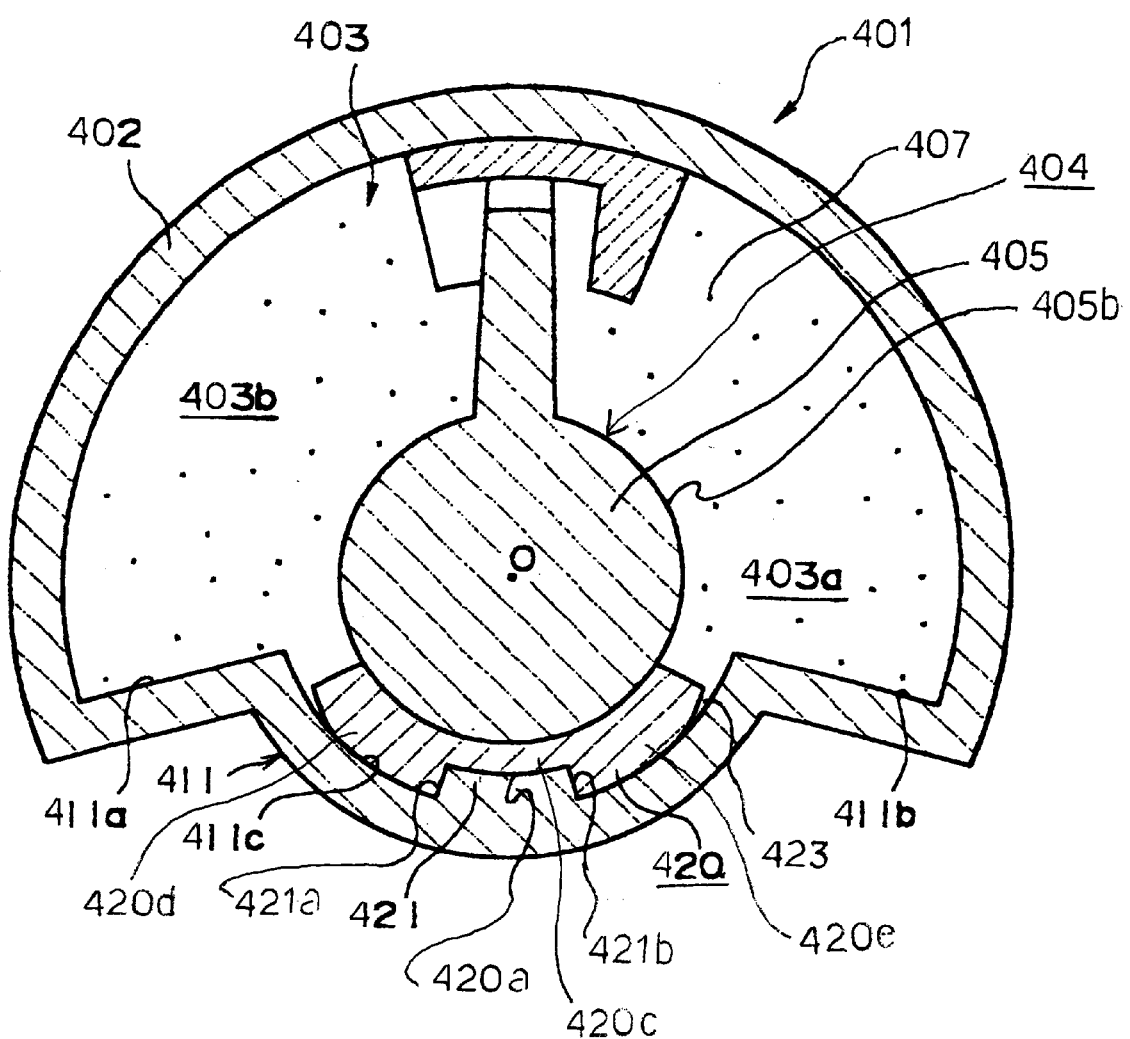
FIG. 8 is a transverse sectional view showing a second embodiment of a rotary damper in accordance with the present invention.
Figure 9:
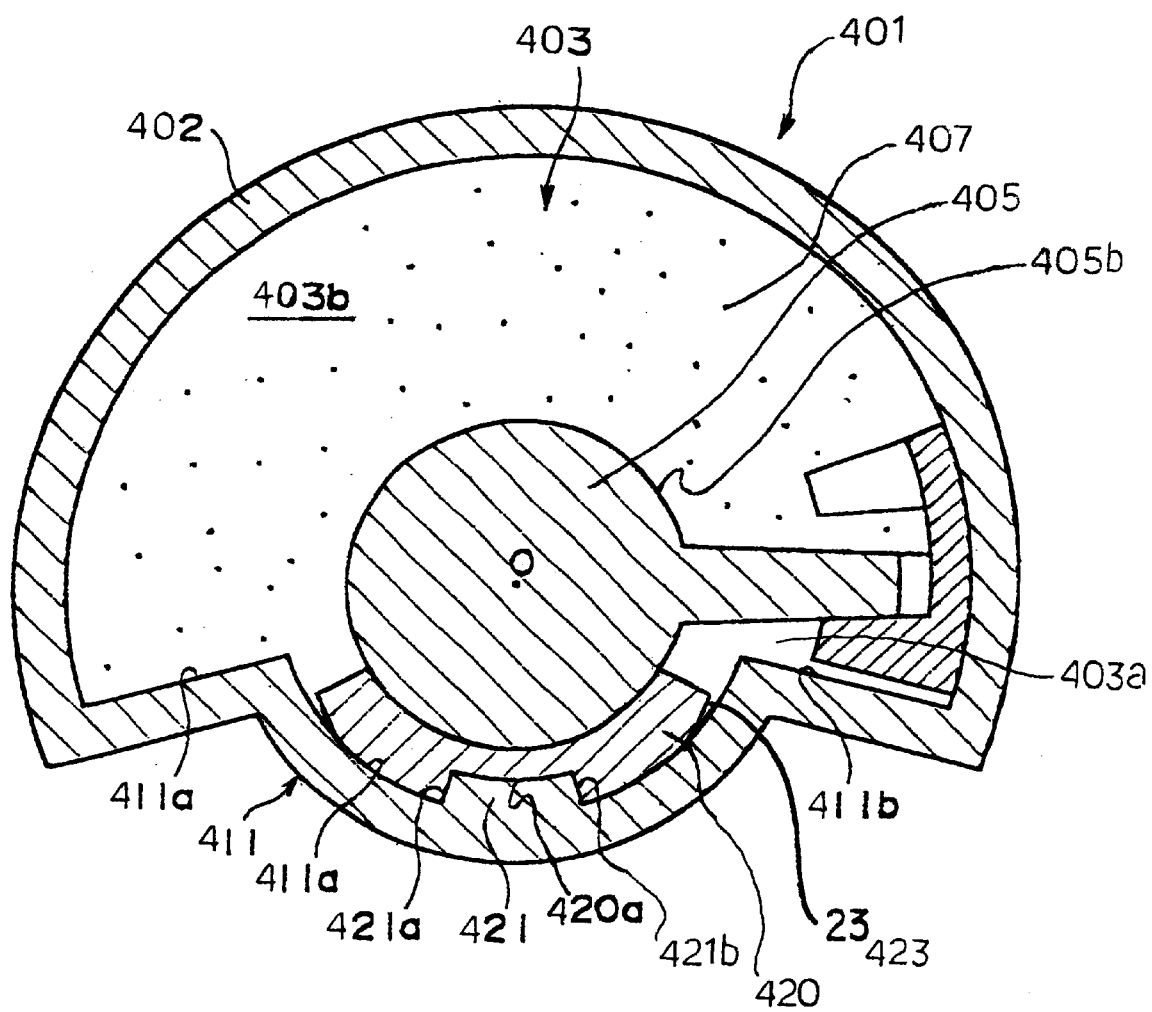
FIG. 9 is a transverse sectional view of the rotary damper in accordance with the second embodiment.

Next, a second embodiment of a rotary damper in accordance with the present invention will be described with reference to FIGS. 8 and 9, except for the same elements as those in the first embodiment. FIGS. 8 and 9 are transverse sectional views of a rotary damper in accordance with the second embodiment. FIG. 8 shows the state corresponding to the state shown in FIG. 5 in the first embodiment, and FIG. 9 shows the state corresponding to the state shown in FIG. 4. In FIGS. 8 and 9, the similar reference numerals are applied to the same elements as those in the first embodiment.

In the rotary damper 401 of the second embodiment, the casing 402 has a substantially cylindrical shape, and the land 411 is provided by bending about a half of the outer circumferential surface of the chamber 403. Both of side faces 411a and 411b of the land 411 extend in the radial direction of the casing 402, and both of side faces are directed to the center O, and an angle made by the side faces is about 150 degrees, a land with a large angle being formed. An inward protrusion 421 is formed along the axial direction in the central portion in the circumferential direction of the inner end face 411c of the land 411. The side faces 421a and 421b of the inward protrusion 421 extend in the radial direction of the casing 2, and the protrusion width is narrower toward the inside.

The upper face of the spacer 420 has a shape substantially complementary to the outer circumferential surface of the proximal portion 405. The lower face of the spacer 420 has a shape substantially complementary to the inner end face 411c of the land 411, and is provided with the concave portion 420a engaging with the inward protrusion 421 of the land 411 in a the compression compartment 403a of the inward protrusion 421 forms the transverse face which is disposed transversely with respect to the rotational direction of the rotatable member 404. The spacer 420 has a center portion 420c positioned between the proximal portion 405 of the rotatable member 404 and the protrusion 421, and side portions 420d, 420e extending in opposite directions from the center portion 420c along the inner end face 411c of the land 411. Each or the side portion 420d, 420e has an end face confronting the inner end face 411c of the land 411. The end face of the side portion 420e close to the compression compartment 403a has a portion at the extremity in the circumferential direction close to the compression compartment 403a spaced apart from the inner end face 411c of the land 411 to keep a gap 423 therebetween. The gap 423 may be formed between the end face of the side portion 420d of the spacer 420 and the inner end face 411c of the land 411. When the rotary damper is assembled the spacer 420 is mounted on the land 411 in such a manner that the inward protrusion 421 fits into the concave portion 20a as shown in FIG. 8.

The construction for engaging the spacer 420 with the land 411 may be such that an outward protrusion having a width being narrower toward the outside is provided on the lower face of the spacer 420, and an enraging concave portion having a shape complementary to the outward protrusion is formed in the inner end face 411c of the land 411.

The state shown in FIG. 8 is a state in which the rotatable member 404 is rotating counterclockwise in the drawing. In this state, the viscous fluid 407 moves smoothly from the compression compartment 403b to the decompression compartment 403a, so that torque is scarcely produced. Therefore, the rotatable member 404 rotates substantially without resistance.

In the state shown in FIG. 9, the fluid pressure in the compression compartment 403a exhibits the maximum value. When such a high fluid pressure acts on the spacer 420, the high fluid pressure is applied to the gap 423 formed between the end face of the portion of spacer 420 and the inner end face 411c of the land 411. As a result, the upper face of the spacer 420 comes to be pressed against the outer circumferential surface 405b of the proximal portion 405, and the side face on the side of the compression compartment 403a of the concave portion 420a of the spacer 20 comes to be pressed against the side face 421b on the compression compartment side of the inward protrusion 421 in such a manner that the spacer 420 floats slightly toward the, inside along the side faces 421a and 421b of the inward protrusion 421 of the land 411. Thereby, the pressure in the compression compartment 3a can be kept high, with the result hat the produced torque can be kept high reliably.

Next, a modification of the above-described second embodiment will be described with reference to FIGS. 13A and 13B, except for the same elements as those in the second embodiment.

As shown in FIG. 13A, the side face 521b on the side of the compression compartment 503a of the inward protrusion 521 forms the transverse face which is disposed transversely with respect to the rotational direction of the rotatable member 504. The spacer 520 has a center portion 520c positioned between the proximal portion 505 of the rotatable member 504 and the protrusion 521, and side Portions 520d, 520e extending in opposite directions from the center portion 520c along the inner end face 511c of the land 511. Each of the side portion 520d, 520e has an end face confronting the inner end face 511c of the land 511. No gap is formed between the end face of the portion 520e closed to the compression compartment 503a and the inner end face 511c of the land 511 so that the end face of the portion 520e is in contact with the inner end face 511c of the land 511. As shown in FIG. 13A, no gap may be formed between the end face of the portion 520d of the spacer 520 and the inner end face 511c of the land 511. In this modification, extended lines of the side faces 520a and 520b of the spacer 520 are tapered toward the outside of the casing 502.

Figure 13B:
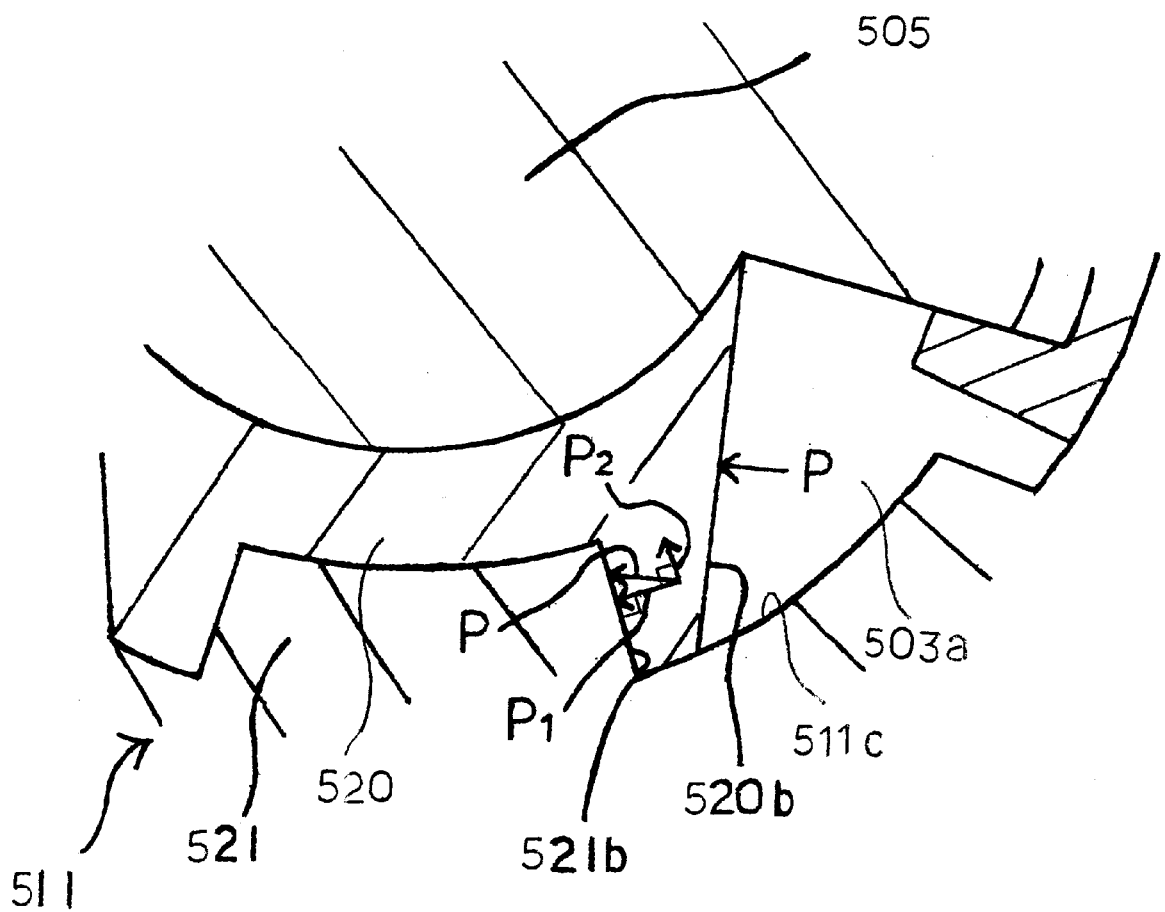
FIG. 13B is a partially enlarged view of FIG. 13A.

As shown in FIG. 13B, the fluid pressure P in the compression compartment 503a acts perpendicularly on the side face 520b on the compression compartment 503a side of the spacer 520. This fluid pressure P also acts on the side face 521b on the compression compartment side of the inward protrusion 521 of the land 511. The fluid pressure P acting on the side face 521b of the inward protrusion 521 is divided into a component pressure $P_1$ in the direction perpendicular to the side face 521b and a component pressure $P_2$ in the direction parallel thereto. By the component pressure $P_2$, the spacer 520 is moved upward along the side face 521b on the compression compartment 503a side of the inward protrusion 21. Therefore, even if a gap is not formed between the end face of the portion on the compression compartment side of the spacer 520 and the inner end face 511c of the land 511 , the spacer can be pressed reliably against the outer circumferential surface 505b of the proximal portion 505 and the side face 521b of the inward protrusion 521 by the pressure of the compression compartment 503a acting on the spacer side face 520b in such a manner that the spacer 520 floats slightly from the inner end face 511c of the land 511.

In the present invention, the rotary damper is constructed so that the land has a transverse face transversely with respect to rotational direction of the rotatable member, and a spacer is interposed between the land and the proximal portion of the rotatable member and adapted to be pressed against the outer circumferential surface of the proximal portion of the rotatable member and the transverse face of the land by the pressure built up in the compression compartment in response to the rotation of the rotatable member.

Thereby, in the high torque region, the spacer is brought into close contact with the outer circumferential surface of the proximal portion of the rotatable member and the transverse face of the land by the pressure on the compression compartment side. The gap between the outer circumferential surface of the proximal portion and the inner end face of the land can be closed reliably at the time when a high torque is produced, so that a decrease in torque caused by the eccentric rotation of the proximal portion can be prevented. Also, even if a spacer portion on the outer circumferential surface side of the proximal portion of the rotatable member is worn by the long-term use of the rotary damper, a decrease in torque in the high rotation torque region can be prevented.

In the present invention, the spacer is provided so as to cover the inner end face of the land and the side face on the side of the compression compartment of the land, and in the present invention defined in claim 4, the spacer is mounted on the inner end face of the land while engaging with the inward protrusion provided on the inner end face of the land. Therefore, the spacer does not come off from the land by the pressure on the compression compartment side, and can be disposed reliably on the land.

In the present invention, the spacer has a portion along the side face of the land and such portion has an end face confronting the inner circumferential surface of the chamber to keep therebetween. Therefore, in the high torque region, the spacer is pressed against the outer circumferential surface of the proximal portion of the rotatable member and the side face on the compression compartment side of the land by the pressure on the compression compartment side in such a manner as to float from the inner end face of the land, so that the gap between the outer circumferential surface of tie proximal portion and the inner end face of the land can be closed reliably, whereby a decrease in torque. can be prevented.

In the present invention, the spacer has a portion on the side of the compression compartment such portion has an end face confronting the inner end face of the land to keep a gap therebetween Therefore, the spacer is pressed against the outer circumferential surface of the proximal portion of the rotatable member and the side face on the compression compartment side of the inward protrusion in such a manner as to float from the inner end face of the land, so that the gap between the outer circumferential surface of the proximal portion and the inner end face of the land can be closed reliably, whereby a decrease in torque can be prevented.

The spacer is formed of a plastic material, by which friction between the outer circumferential surface of the proximal portion and the spacer can be decreased, or the spacer is formed of a rubber-like material using elasticity, by which the property of close contact with the outer circumferential surface of the proximal portion can be enhanced. Further, the spacer is formed of a metal with high wear resistance, by which the strength and durability of the spacer can be increased. In particular, the plastic material is a fluorine-containing plastic material, which achieves an effect that friction between the outer circumferential surface of the proximal portion of the rotatable member and the spacer can firer be decreased.

What is claimed is:

1. A rotary damper, comprising:

a casing having a chamber defined therein;

a viscous fluid filled in said chamber;

a rotatable member being relatively rotatable with respect to said casing, the proximal portion of said rotatable member being accommodated in said chamber;

a ridge member extending axially along and projecting radially outwardly from an outer circumferential surface of the proximal portion of said rotatable member, said ridge member having a radially outer end face disposed for sliding contact with an inner circumferential surface of said chamber; and a land extending axially along and projecting inwardly from said inner circumferential surface of said chamber, said land having a transverse face transversely with respect to the rotational direction of said rotatable member, said ridge member and said land dividing an interior of said chamber into a compression compartment and a decompression compartment, the volume of said compression and decompression compartments being variable complementarily to each other in response to said relative rotation of said rotatable member and said casing, a spacer with an extension portion contacting said transverse face of said land, said spacer interposed between the land and the proximal portion of said rotatable member and adapted to be pressed against the outer circumferential surface of the proximal portion of said rotatable member and said transverse face of said land by the pressure built up in said compression compartment in response to rotation of said rotatable member.

2. The rotary damper according to claim 1, wherein a side face on the side of said compression compartment of said land forms said transverse face, and said spacer is disposed so as to cover an inner end face and said transverse face of said land.

3. The rotary damper according to claim 2, wherein said extension portion has an end face confronting the inner circumferential surface of said chamber to keep a gap therebetween.

4. The rotary damper according to claim 1, wherein said land is provided with an inward protrusion on the inner end face thereof, a side face on the side of said compression compartment of said inward protrusion forms said transverse face and said spacer is mounted on the inner end face of said land while engaging with said inward protrusion.

5. The rotary damper according to claim 4, wherein said extension portion has an end face confronting the inner end face of the land to keep a gap therebetween.

6. The rotary damper according to any one of claims 1 to 5, wherein said spacer is made from at least one of a group consisting of plastic, rubber-like material and metal.

7. The rotary damper according to claim 6, wherein said plastic material is a fluorine-containing plastic.

* * * * *